United States Patent
Fisher et al.

(10) Patent No.: US 10,596,783 B2
(45) Date of Patent: Mar. 24, 2020

(54) STIFF INTERLAYERS FOR LAMINATED GLASS STRUCTURES

(71) Applicant: CORNING INCORPORATED, Corning, NY (US)

(72) Inventors: William Keith Fisher, Suffield, CT (US); Mark Stephen Friske, Campbell, NY (US); Anurag Jain, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/402,624

(22) PCT Filed: May 31, 2013

(86) PCT No.: PCT/US2013/043512
§ 371 (c)(1),
(2) Date: Nov. 20, 2014

(87) PCT Pub. No.: WO2013/181484
PCT Pub. Date: Dec. 5, 2013

(65) Prior Publication Data
US 2015/0111016 A1    Apr. 23, 2015

Related U.S. Application Data

(60) Provisional application No. 61/653,865, filed on May 31, 2012.

(51) Int. Cl.
*B32B 17/10*  (2006.01)
*B32B 7/022*  (2019.01)
*B32B 7/02*   (2019.01)

(52) U.S. Cl.
CPC .......... *B32B 17/10036* (2013.01); *B32B 7/02* (2013.01); *B32B 7/022* (2019.01);
(Continued)

(58) Field of Classification Search
CPC ....... Y10T 428/2495; Y10T 428/24983; Y10T 428/24967; B32B 17/1055–1099;
(Continued)

(56) References Cited

U.S. PATENT DOCUMENTS 3,220,973 A   11/1965   Goldberg
3,622,440 A   11/1971   Piscataway
(Continued)

FOREIGN PATENT DOCUMENTS

CN   104610871 A   5/2015
DE   9211909       12/1992
(Continued)

OTHER PUBLICATIONS

"Mowitel(R): Polyvinyl butyral of superior quality". Kuraray Specialties Europe GmbH, (2003); pp. 1-36.*
(Continued)

*Primary Examiner* — Prashant J Khatri
(74) *Attorney, Agent, or Firm* — John P. Ciccarelli

(57) ABSTRACT

A new laminated glass structure for automotive glazing, architectural window and other applications that includes two sheets of relatively thin, optionally chemically strengthened glass, such as Corning® Gorilla® Glass, with a composite interlayer structure that includes at least one relatively stiff layer having relatively high Young's modulus of 50 MPa or higher and a relatively softer polymer layer having a relatively low Young's modulus of 20 MPa or lower.

13 Claims, 3 Drawing Sheets

(52) U.S. Cl.
CPC .. *B32B 17/10137* (2013.01); *B32B 17/10743* (2013.01); *B32B 17/10752* (2013.01); *B32B 17/10761* (2013.01); *B32B 17/10779* (2013.01); *B32B 17/10788* (2013.01); *B32B 2250/05* (2013.01); *B32B 2307/102* (2013.01); *B32B 2307/40* (2013.01); *B32B 2307/51* (2013.01); *B32B 2307/56* (2013.01); *B32B 2419/00* (2013.01); *B32B 2451/00* (2013.01); *B32B 2605/00* (2013.01); *Y10T 428/2495* (2015.01); *Y10T 428/24967* (2015.01); *Y10T 428/24983* (2015.01)

(58) Field of Classification Search
CPC ........ B32B 17/10036; B32B 17/10137; B32B 17/10761
See application file for complete search history.

(56) References Cited

U.S. PATENT DOCUMENTS

| | | | |
|---|---|---|---|
| 3,666,614 A | 5/1972 | Snedeker et al. | |
| 3,790,430 A * | 2/1974 | Mochel | C03C 3/091 351/159.57 |
| 3,801,423 A | 4/1974 | Van Laethem et al. | |
| 4,243,719 A | 1/1981 | Holmes | |
| 4,483,700 A | 11/1984 | Forker, Jr. et al. | 65/30.14 |
| 4,668,574 A | 5/1987 | Bolton et al. | |
| 4,985,099 A | 1/1991 | Mertens et al. | |
| 5,262,232 A | 11/1993 | Wilfong et al. | |
| 5,589,272 A | 12/1996 | Braun et al. | |
| 5,670,006 A | 9/1997 | Wilfong et al. | |
| 5,674,790 A | 10/1997 | Araujo | 501/66 |
| 5,696,179 A | 12/1997 | Chawla | |
| 5,744,557 A | 4/1998 | McCormick et al. | |
| 5,856,022 A | 1/1999 | McCormick et al. | |
| 5,863,664 A | 1/1999 | McCormick et al. | |
| 6,069,214 A | 5/2000 | McCormick et al. | |
| 6,069,219 A | 5/2000 | McCormick et al. | |
| 6,132,882 A | 10/2000 | Landin et al. | |
| 6,251,493 B1 | 6/2001 | Johnson et al. | |
| 6,265,054 B1 | 7/2001 | Brevet et al. | |
| 6,298,189 B1 | 10/2001 | Szum et al. | |
| 6,432,522 B1 * | 8/2002 | Friedman | B32B 17/10036 428/212 |
| 6,821,629 B2 | 11/2004 | Garnier et al. | |
| 6,849,333 B2 | 2/2005 | Schissel et al. | |
| 7,018,700 B2 | 3/2006 | Park | |
| 7,121,380 B2 | 10/2006 | Garnier et al. | |
| 7,189,457 B2 | 3/2007 | Anderson | |
| 7,226,955 B2 | 6/2007 | Subramonian et al. | |
| 7,276,543 B2 | 10/2007 | Bishop et al. | |
| 7,666,511 B2 | 2/2010 | Ellison et al. | 428/426 |
| 7,754,338 B2 | 7/2010 | Anderson | |
| 7,764,855 B2 | 7/2010 | Roba et al. | |
| 7,799,840 B2 | 9/2010 | Wheeler et al. | |
| 7,829,192 B2 | 11/2010 | Boure et al. | 428/437 |
| 7,867,605 B2 | 1/2011 | Moran et al. | |
| 7,892,629 B2 | 2/2011 | Rehfeld et al. | |
| 7,973,106 B2 | 7/2011 | Fisk et al. | |
| 8,092,919 B2 | 1/2012 | Lee et al. | |
| 8,101,267 B2 | 1/2012 | Samuels et al. | 428/212 |
| 8,242,185 B2 | 8/2012 | Smith et al. | |
| 8,313,838 B2 | 11/2012 | Steuer et al. | |
| 8,328,273 B2 | 12/2012 | Baroggi et al. | |
| 8,541,504 B2 | 9/2013 | Kusanose et al. | |
| 8,632,887 B2 | 1/2014 | Iwamoto et al. | |
| 8,686,060 B2 | 4/2014 | Smith et al. | |
| 8,691,911 B2 | 4/2014 | Doshi et al. | |
| 8,835,750 B2 | 9/2014 | Lenges | |
| 8,889,254 B2 | 11/2014 | Bayne et al. | |
| 8,892,799 B2 | 11/2014 | Frese | |
| 8,986,072 B2 | 3/2015 | Darcangelo et al. | |
| 9,102,122 B2 | 8/2015 | Rehfeld et al. | |
| 2001/0044023 A1 | 11/2001 | Johnson et al. | |
| 2001/0046595 A1 | 11/2001 | Moran et al. | |
| 2003/0203167 A1 | 10/2003 | Bell et al. | |
| 2005/0129954 A1 | 6/2005 | Anderson | 428/412 |
| 2005/0192398 A1 | 9/2005 | Wong et al. | 524/557 |
| 2006/0165929 A1 | 7/2006 | Lenges et al. | |
| 2007/0014976 A1 * | 1/2007 | Matsudo | B32B 17/10018 428/212 |
| 2007/0154694 A1 * | 7/2007 | Samuels | B32B 17/10036 428/216 |
| 2007/0224427 A1 | 9/2007 | Kunita et al. | |
| 2008/0207829 A1 | 8/2008 | Hofmann et al. | |
| 2008/0248315 A1 | 10/2008 | Wand | |
| 2008/0254302 A1 * | 10/2008 | Bourcier | B29C 47/0021 428/437 |
| 2008/0272513 A1 | 11/2008 | Stenzel | |
| 2009/0311497 A1 * | 12/2009 | Aoki | B32B 17/10045 428/214 |
| 2010/0119846 A1 | 5/2010 | Sawada | |
| 2011/0135269 A1 | 6/2011 | Kim et al. | |
| 2011/0165393 A1 | 7/2011 | Bayne et al. | |
| 2012/0094084 A1 | 4/2012 | Fisher et al. | |
| 2012/0094100 A1 | 4/2012 | Takagi et al. | |
| 2012/0128313 A1 | 5/2012 | Wu et al. | |
| 2012/0135226 A1 | 5/2012 | Bookbinder et al. | |
| 2012/0240626 A1 | 9/2012 | Matsumoto et al. | |
| 2012/0328843 A1 | 12/2012 | Cleary et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson | |
| 2013/0127202 A1 | 5/2013 | Hart | |
| 2013/0242562 A1 | 9/2013 | Labrot | |
| 2013/0295357 A1 | 11/2013 | Cleary et al. | |
| 2013/0319046 A1 | 12/2013 | Cleary et al. | |
| 2013/0323415 A1 | 12/2013 | Brackley et al. | |
| 2014/0087159 A1 | 3/2014 | Cleary et al. | |
| 2014/0087193 A1 | 3/2014 | Cites et al. | |
| 2014/0089159 A1 | 3/2014 | Chellaboina et al. | |
| 2014/0141217 A1 | 5/2014 | Gulati et al. | |
| 2014/0239034 A1 | 8/2014 | Cleary et al. | |
| 2014/0262002 A1 | 9/2014 | Suwa et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0174861 A1 | 6/2015 | Hasegawa et al. | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Fredholm et al. | |
| 2016/0207290 A1 | 7/2016 | Cleary et al. | |
| 2016/0207819 A1 | 7/2016 | Cleary et al. | |
| 2016/0207820 A1 | 7/2016 | Cleary et al. | |
| 2016/0250825 A1 | 9/2016 | Cleary et al. | |

FOREIGN PATENT DOCUMENTS

| | | | |
|---|---|---|---|
| DE | 4302327 A1 | 8/1994 | |
| DE | 202010008579 | 11/2011 | B32B 17/10 |
| EP | 532478 A2 | 3/1993 | |
| EP | 572077 A1 | 12/1993 | |
| EP | 957116 B1 | 6/2007 | |
| EP | 2153989 | 2/2010 | B32B 27/30 |
| EP | 2281860 B9 | 9/2011 | |
| EP | 2363285 | 9/2011 | |
| JP | 11035349 | 2/1999 | |
| JP | 2000177381 A | 6/2000 | |
| JP | 2000280414 | 10/2000 | |
| JP | 2006160562 A | 6/2006 | |
| JP | 2007106659 | 4/2007 | |
| JP | 04166363 | 10/2008 | |
| JP | 2015145464 A | 8/2015 | |

(56) References Cited

FOREIGN PATENT DOCUMENTS

| KR | 1048272 | | 7/2011 | | |
|---|---|---|---|---|---|
| KR | 2014134050 | A | 11/2014 | | |
| KR | 1515691 | B1 | 4/2015 | | |
| KR | 2015092510 | A | 8/2015 | | |
| TW | 201245076 | | 11/2012 | | |
| WO | 198001051 | | 5/1980 | | |
| WO | 1992020751 | A1 | 11/1992 | | |
| WO | 1995023772 | A1 | 9/1995 | | |
| WO | 200138088 | | 5/2001 | | |
| WO | 2003078536 | A2 | 9/2003 | | |
| WO | 2006102049 | A2 | 9/2006 | | |
| WO | WO2006/102049 | | 9/2006 | ............ | B32B 17/10 |
| WO | 2006116440 | A2 | 11/2006 | | |
| WO | 2007073520 | A2 | 6/2007 | | |
| WO | WO2008/137367 | A2 | 11/2008 | | |
| WO | WO2008/137367 | A3 | 11/2008 | ............ | B32B 17/10 |
| WO | 2010027041 | A1 | 3/2010 | | |
| WO | 2010040014 | A1 | 4/2010 | | |
| WO | WO2011081191 | | 7/2011 | ............ | C03C 27/12 |
| WO | WO2012051038 | | 4/2012 | ............ | B32B 17/10 |
| WO | 2012112856 | A1 | 8/2012 | | |
| WO | 2014058163 | A1 | 4/2014 | | |
| WO | 2014084892 | A1 | 6/2014 | | |
| WO | 2014120593 | A1 | 8/2014 | | |

OTHER PUBLICATIONS

"Property Information: Young's Modulus and Specific Stiffness". http://www-materials.eng.cam.ac.uk/mpsite/properties/non-IE/stiffness.html. Retrieved Nov. 15, 2018.*

Japanese Patent Application No. 2015-515217, English translation of Japanese Notification of Grounds for Rejection, Feb. 2, 2016, 3 pages.

Patent Cooperation Treaty International Notification of Transmittal of the International Search Report and the Written Opinion of the International Searching Authority, international application No. PCT/US2013/043512: dated Aug. 14, 2013, 4 pages.

International Preliminary Report on Patentability; PCT/US2013/043512; dated Dec. 11, 2014; 9 Pages.

Zhao et al. "Glass Technolgy" Chemical Industry Press, 2006, pp. 334-338 (No English Translation Available).

English Translation of JP2016183971 Office Action dated Sep. 12, 2017; 2 Pages; Japanese Patent Office.

* cited by examiner

STIFF INTERLAYERS FOR LAMINATED GLASS STRUCTURES

CROSS-REFERENCE TO RELATED APPLICATIONS

This application claims the benefit of priority under 35 U.S.C. § 371 of International Application Number PCT/US13/43512 filed May 31, 2013 which claims the benefit of priority to U.S. Provisional Application No. 61/653,865 filed on May 31, 2012, the content of which is relied upon and incorporated herein by reference in its entirety.

FIELD

The disclosure relates generally to relatively stiff interlayer materials for laminated thin glass structures and acoustic dampening thin glass laminate structures including such relatively stiff interlayer, which structures may be used in automotive glazing and other vehicle and architectural applications.

BACKGROUND

Glass laminates can be used as windows and glazing in architectural and vehicle or transportation applications, including automobiles, rolling stock, locomotive and airplanes. Glass laminates can also be used as glass panels in balustrades and stairs, and as decorative panels or covering for walls, columns, elevator cabs, kitchen appliances and other applications. As used herein, a glazing or a laminated glass structure is a transparent, semi-transparent, translucent or opaque part of a window, panel, wall, enclosure, sign or other structure. Common types of that glazing that are used in architectural and vehicle applications include clear and tinted laminated glass structures.

Conventional automotive glazing constructions may consist of two plies of 2 mm soda lime glass (heat treated or annealed) with a polyvinyl butyral PVB interlayer. These laminate constructions have certain advantages, including, low cost, and a sufficient impact resistance for automotive and other applications. However, because of their limited impact resistance, these laminates usually have a poor behavior and a higher probability of breakage when getting struck by roadside stones, vandals and other impacts.

In many vehicle applications, fuel economy is a function of vehicle weight. It is desirable, therefore, to reduce the weight of glazings for such applications without compromising their strength and sound-attenuating properties. In view of the foregoing, thinner, economical glazings or glass laminates that possess or exceed the durability, sound-damping and breakage performance properties associated with thicker, heavier glazings are desirable.

No admission is made that any reference cited herein constitutes prior art. Applicant expressly reserves the right to challenge the accuracy and pertinence of any cited documents.

SUMMARY

The present disclosure describes a new thin laminated glass structure for automotive glazing, architectural window and other applications. The new structure described herein includes two sheets of relatively thin chemically strengthened glass, such as Corning® Gorilla® Glass with composite interlayers that include a relatively stiff, relatively high modulus polymer layer and a relatively softer, lower modulus polymer layer. Such an interlayer can impart both desirable acoustic damping properties and rigidity, characterized by a sufficient degree of resistance to deflection or deformation to meet automotive and architectural specifications and standardized tests.

Thin glass laminate mechanical properties depend on the properties of the interlayer to a greater degree than existing relatively thick soda lime glass laminates, because the interlayer comprises a much greater fraction of total laminate thickness for thin glass laminates than existing soda lime glass laminates. Properly engineered interlayers play a significant role in determining mechanical properties of thin glass laminates, such as its acoustic, optical, and rigidity properties. Acoustic damping of a laminated thin glass structure is primarily determined by shear modulus and loss factor of the polymer interlayer. When the interlayer is a large fraction of the total glass laminate thickness, then the bending rigidity (load deformation properties) of the laminated thin glass structure will be largely determined by the Young's modulus of the interlayer. Using multilayer interlayers, these properties can be adjusted independently in each layer in order to create a laminate having satisfactory rigidity and acoustic damping properties.

One embodiment of the disclosure relates to a thin glass laminate structure having two glass sheets having a thickness of less than 1.5 mm; a composite interlayer between the two glass sheets comprising at least one relatively stiff polymer layer having a Young's modulus of 50 MPa or greater and a relatively soft polymer layer having a Young's modulus of less than 20 MPa.

An additional embodiment of the disclosure relates to such a thin glass laminate structure having two of the relatively stiff polymer layers and the relatively soft polymer layer is located between the two relatively stiff polymer layers.

According to some embodiments of the present disclosure, the relatively stiff polymer layers have a Young's modulus of about 100 MPa or greater, or in a range from about 100 MPa to about 1000 MPa. The relatively soft polymer layer has a Young's modulus of in a range from about 1 MPa to 10 MPa, or about 10 MPa or less, or in a range from about 1 MPa to 10 MPa.

In other embodiments hereof, the relatively stiff polymer layer has a Young's modulus that is about 10× the Young's modulus of the relatively soft polymer layer, or about 100× the Young's modulus of the relatively soft polymer layer.

In other embodiments hereof, the composite interlayer may makes up a majority of the total glass laminate thickness. The composite interlayer may make up about 57% of the total glass laminate thickness.

The thin glass laminate structure as in claim 1, wherein the polymer layers are formed of a thermoplastic polymer selected from the group consisting of PVB, ionomer, PET, SentryGlas® from DuPont, EVA, and TPU.

In other embodiments hereof, the thin glass sheets each have a thickness in a range from about 0.5 mm to about 1.5 mm. The glass sheets may additionally be chemically strengthened.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
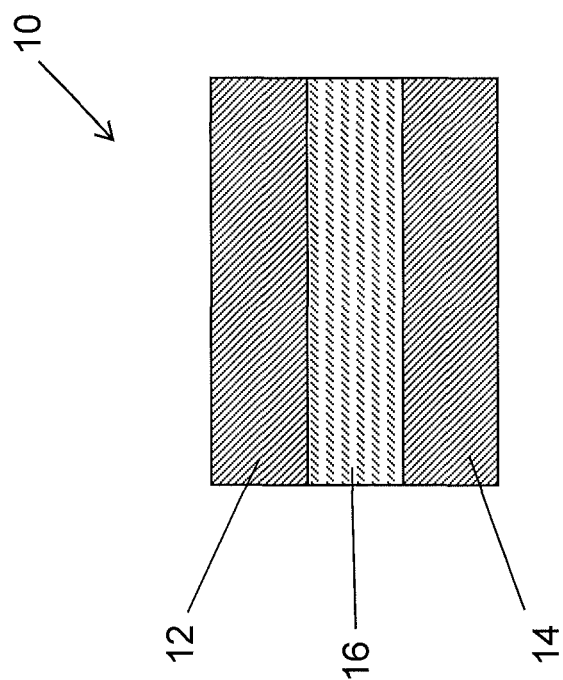
FIG. 1 is a partial cross-sectional illustration of stiff interlayer structure according an embodiment of the present description.

FIG. 1 is a partial cross-sectional schematic illustration of a polymer or composite interlayer structure (or simply an interlayer) 10 according to an embodiment hereof. The interlayer structure 10 may include two relatively stiff outer layers 12 and 14 laminated one either side of a central relatively soft central layer 16. However, embodiments hereof include an interlayer 10 having a single relatively stiff layer 12 and a relatively soft layer 16. The relatively stiff outer layers 12 and 14 may be formed of a relatively stiff polymer, such as an ionmer. For example, the outer layers may be formed of SentryGlas® from DuPont, polycarbonate, or a relatively stiff polyvinyl butyral (PVB). An example of a relatively stiff PVB is Saflex DH from Solutia. By relatively stiff as used in the present description and the appended claims, it is meant that the outer layers have a Young's modulus of about 20 MPa or greater, about 50 MPa or greater, about 100 MPa or greater, or within a range from about 50 MPa to about 1000 MPa or from about 100 MPa to about 1000 MPa. The relatively soft central layer 16 may be formed of a relatively soft polymer material. For example, the central layer maybe formed of a relatively soft PVB, acoustic PVB, ethylene vinyl acetate (EVA), thermoplastic polyurethane (TPU), or other suitable polymer or thermoplastic material. By relatively soft as used in the present description and the appended claims, it is meant that the central layer 16 has a Young's modulus of about 20 MPa or less, about 10 MPa or less, or within a range from about 10 MPa to about 20 MPa, or from about 1 MPa to 10 MPa. The layers of the interlayer structure 10 described herein may be coextruded together to form a single interlayer sheet with multiple layers, or they may be separately formed and then laminated together in any manner as well known and understood in the art. According to some embodiments hereof, the relatively stiff outer layers 12, 14 may have a Young's modulus that is about 10× to about 100× the Young's modulus of the relatively soft central layer 16. In the case of coextrusion, the outer 12, 14 and central 16 layers in the composite interlayer need to be rheologically and chemically compatible to enable coextrusion as a single sheet.

Figure 2:
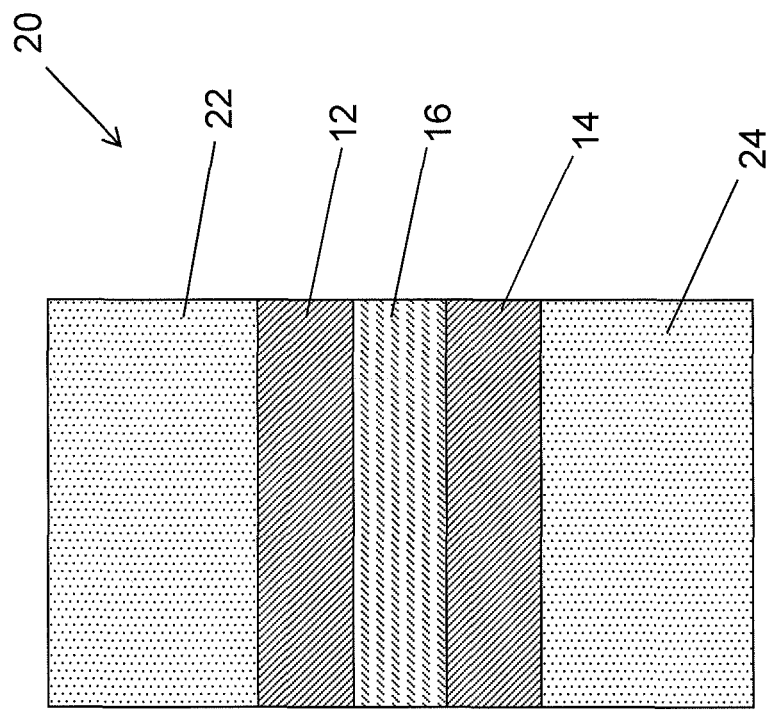
FIG. 2 is a partial cross-sectional illustration of a laminated glass structure including a relatively stiff interlayer structure as illustrate in FIG. 1.

FIG. 2 is a partial cross-sectional schematic illustration of a laminated glass structure 20 according to an embodiment hereof that includes the composite interlayer of FIG. 1. The laminated glass structure includes two thin glass sheets 22 and 24 laminated on either side of an interlayer 10 formed of two outer relatively stiff layers 12 and 14 laminated on either side of a central relatively soft central layer 16. Thin as used in relation to the glass sheets in the present disclosure and the appended claims means glass sheets having a thickness not exceeding about 1.5 mm, not exceeding about 1.0 mm, not exceeding about 0.7 mm, not exceeding about 0.5 mm, or within a range from about 0.5 mm to about 1.5 mm, or from about 0.5 mm to about 1.0 mm or from about 0.5 mm to about 0.7 mm. According to some embodiments hereof, the composite interlayer 10 makes up a large fraction of the total laminate thickness, such as a majority (>50%) of the total thickness of the laminated glass structure 20. For example, for standard automotive laminated glass structures the interlayer structure may make up about 20% of the total glass laminate thickness, whereas for thin glass laminate structures of the present disclosure the interlayer structure may make up about 57% or more of the total glass laminate thickness.

According to an embodiment hereof, the glass sheets may be formed of thin glass sheets that have been chemically strengthened using an ion exchange process, such as Corning Gorilla® glass. As described in U.S. Pat. Nos. 7,666,511, 4,483,700 and 5,674,790, Corning Gorilla glass is made by fusion drawing a glass sheet and then chemical strengthening the glass sheet. As described in more detail hereinafter, Corning Gorilla glass has a relatively deep depth of layer (DOL) of compressive stress, and presents surfaces having a relatively high flexural strength, scratch resistance and impact resistance. The glass sheets 22 and 24 and the interlayer 10 may be bonded together during a lamination process in which the glass sheet 22, interlayer 10 and glass sheet 24 are stacked one on top of the other, pressed together and heated to a temperature of, by way of example, 130° C. or a temperature that is near or slightly above the softening temperature of the outer layers 12 and 14, such that the outer layers 12 and 14 of the interlayer 10 are adhered to the glass sheets.

Figure 3:
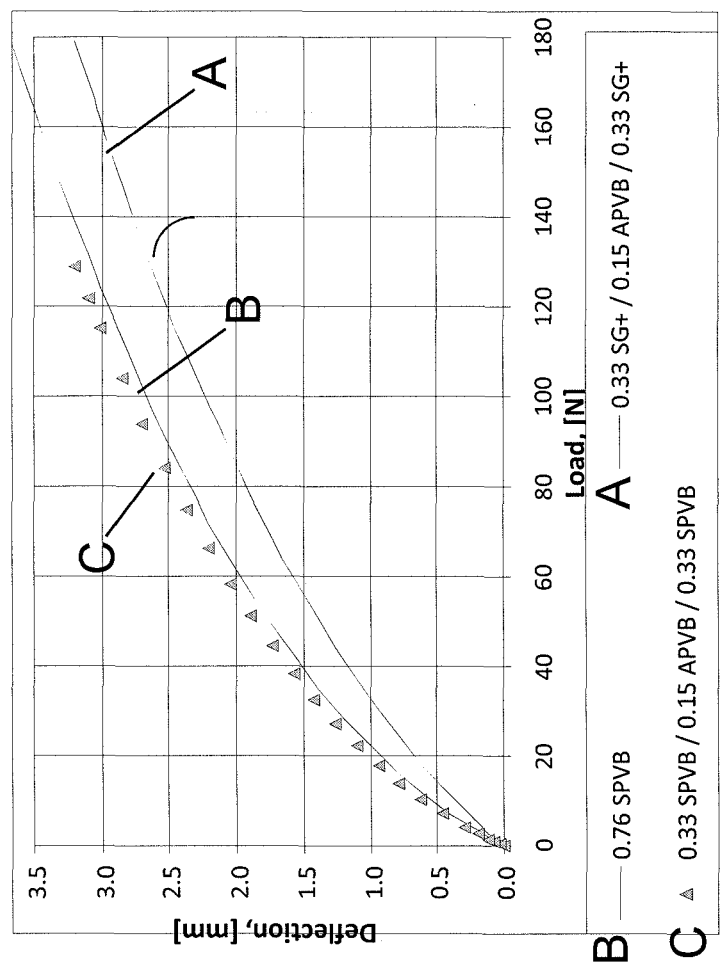
FIG. 3 is a plot of the results of modeling studies comparing the load/deformation properties of laminated glass structures that include two sheets of 0.7 mm thick Corning Gorilla Glass interlayers formed of standard PVB, standard acoustic tri-layer PVB and a tri-layer PVB with stiff outer layers according to the present description.

FIG. 3 shows results of finite element modeling studies of 0.7 mm thick Corning Gorilla Glass laminated glass structures made using standard 0.76 mm thick monolithic PVB (0.76 SPVB) (line A), standard acoustic tri-layer PVB (0.33SPVB/0.15APVB/0.33SPVB) (line B) and a tri-layer PVB with stiffened outer layers (0.33SG+/0.15APVB/0.33SG+) (line C). The physical properties of the outer layers for the stiffened interlayer were adjusted to those of SentryGlas® from DuPont. The benefit of stiffening the outer layers results in a more rigid laminate as indicated having reduced deformation upon loading.

Suitable glass sheets may be chemically strengthened by an ion exchange process. In such an ion exchange process, the sheet of glass are typically immersed in a molten salt bath for a predetermined period of time. Ions within the glass sheet at or near the surface of the glass sheet are exchanged for larger metal ions, for example, from the salt bath. In one embodiment, the temperature of the molten salt bath is about 430° C. and the predetermined time period is about eight hours. The incorporation of the larger ions into the glass strengthens the glass sheet by creating a compressive stress in a near surface region of the glass sheet. A corresponding tensile stress is induced within a central region of the glass sheet to balance the compressive stress.

Example ion-exchangeable glasses that are suitable for forming glass laminates are alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt, %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for forming glass laminates as described herein comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤$(Li_2O+Na_2O+K_2O)$ ≤20 mol. % and 0 mol. %≤(MgO+CaO)≤10 mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤$(Li_2O+Na_2O+K2O)$≤18 mol. % and 2 mol. %≤(MgO+ CaO)≤7 mol. %.

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $Li_2O+ Na_2O+K_2O$≤20 mol. % and 0 mol. %≤MgO+CaO≤10 mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3+CaO$≤69 mol. %; $Na_2O+K_2O+B_2O_3+MgO+CaO+SrO$>10 mol. %; 5 mol. %≤MgO+CaO+SrO≤8 mol. %; $(Na_2O+B_2O_3)$– $Al_2O_3$≤2 mol. %; 2 mol. %≤$Na_2O$–$Al_2O_3$≤6 mol. %; and 4 mol. %≤$(Na_2O+K_2O)$–$Al_2O_3$≤10 mol. %.

The chemically-strengthened as well as the non-chemically-strengthened glass, in some embodiments, is batched with 0-2 mol. % of at least one fining agent selected from a group that includes $Na_2SO_4$, NaCl, NaF, NaBr, $K_2SO_4$, KCl, KF, KBr, and $SnO_2$.

In one example embodiment, sodium ions in the glass can be replaced by potassium ions from the molten bath, though other alkali metal ions having a larger atomic radius, such as rubidium or cesium, can replace smaller alkali metal ions in the glass. According to particular embodiments, smaller alkali metal ions in the glass can be replaced by Ag+ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center region of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

According to various embodiments, thin glass laminates comprising one or more sheets of ion-exchanged glass and having a specified depth of layer versus compressive stress profile possess an array of desired properties, including low weight, high impact resistance, and improved sound attenuation.

In one embodiment, a chemically-strengthened glass sheet can have a surface compressive stress of at least 300 MPa, e.g., at least 400, 500, or 600 MPa, a depth of at least about 20 µm (e.g., at least about 20, 25, 30, 35, 40, 45, or 50 µm) and/or a central tension greater than 40 MPa (e.g., greater than 40, 45, or 50 MPa) and less than 100 MPa (e.g., less than 100, 95, 90, 85, 80, 75, 70, 65, 60, or 55 MPa).

Figure 4:
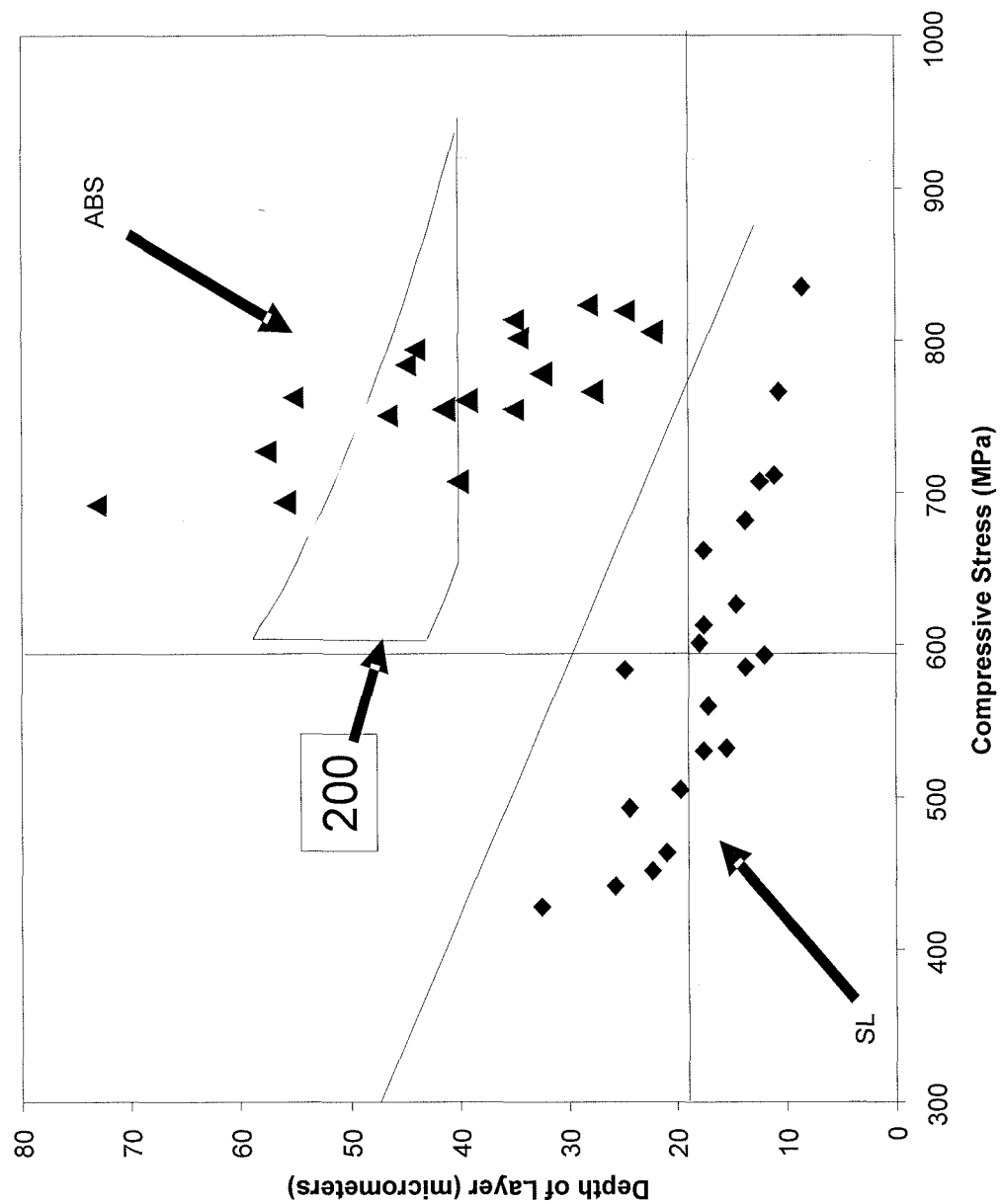
FIG. 4 is a depth of layer versus compressive stress plot for various glass sheets according to embodiments hereof.

An example embodiment is illustrated in FIG. 4, which shows a depth of layer versus compressive stress plot for various glass sheets. In FIG. 4, data from a comparative soda lime glass are designated by diamonds "SL" while data from chemically-strengthened aluminosilicate glasses are designated by triangles "GG." As shown in the illustrated embodiment, the depth of layer versus surface compressive stress data for the chemically-strengthened sheets can be defined by a compressive stress of greater than about 600 MPa, and a depth of layer greater than about 20 micrometers. A region 200 is defined by a surface compressive stress greater than about 600 MPa, a depth of layer greater than about 40 micrometers, and a tensile stress between about 40 and 65 MPa. Independently of, or in conjunction with, the foregoing relationships, the chemically-strengthened glass can have depth of layer that is expressed in terms of the corresponding surface compressive stress. In one example, the near surface region extends from a surface of the first glass sheet to a depth of layer (in micrometers) of at least 65-0.06 (CS), where CS is the surface compressive stress and has a value of at least 300 MPa. This linear relationship is pictured by the sloped line in FIG. 4. Satisfactory CS and DOL levels are located above the line 65-0.06 (CS) on a plot of DOL on the y-axis and CS on the x-axis.

In a further example, the near surface region extends from a surface of the first glass sheet to a depth of layer (in micrometers) having a value of at least B-M(CS), where CS is the surface compressive stress and is at least 300 MPa. In the foregoing expression, B can range from about 50 to 180 (e.g., 60, 70, 80, 90, 100, 110, 120, 130, 140, 150, 160±5), and M can range independently from about −0.2 to −0.02 (e.g., −0.18, −0.16, −0.14, −0.12, −0.10, −0.08, −0.06, −0.04±−0.01).

A modulus of elasticity of a chemically-strengthened glass sheet can range from about 60 GPa to 85 GPa (e.g., 60, 65, 70, 75, 80 or 85 GPa). The modulus of elasticity of the glass sheet(s) and the polymer interlayer can affect both the mechanical properties (e.g., deflection and strength) and the acoustic performance (e.g., transmission loss) of the resulting glass laminate.

Example glass sheet forming methods include fusion draw and slot draw processes, which are each examples of a down-draw process, as well as float processes. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an example process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

Glass sheets can be used to form glass laminates. As defined herein, a thin glass laminate structure may include two chemically-strengthened glass sheets and a polymer interlayer formed between the glass sheets. The polymer interlayer can comprise a monolithic polymer sheet, a multilayer polymer sheet, or a composite polymer sheet. The polymer interlayer can be, for example, one or more PVB sheets and/or one or more SentryGlas sheets.

Glass laminates for automotive glazing and other applications can be formed using a variety of processes. In an example process, one or more sheets of chemically-strengthened glass sheets are assembled in a pre-press with a polymer interlayer, tacked into a pre-laminate, and finished into an optically clear glass laminate. The assembly, in an example embodiment that comprises two glass sheets, involves laying down a first sheet of glass, overlaying a polymer interlayer, such as a PVB (or SentryGlas) sheet, laying down a second sheet of glass, and then trimming the excess PVB to the edges of the glass sheets. The tacking step can include expelling most of the air from the interfaces and partially bonding the PVB to the glass sheets. The finishing step, typically carried out at elevated temperature and pressure, completes the mating of each of the glass sheets to the polymer interlayer.

The polymer (or thermoplastic), such as PVB or SentryGlas, may be applied as a preformed polymer interlayer. The polymer layer can, in certain embodiments, have a thickness of at least about 0.125 mm (e.g., 0.125, 0.25, 0.375, 0.5, 0.75, 0.76 or 1 mm). The thermoplastic layer can cover most or, preferably, substantially all of the opposed major faces of the two glass sheets. The interlayer may also cover the edge faces of the glass sheets after laminating. The glass sheet(s) in contact with the thermoplastics layer may be heated above the softening point of the polymer, such as, for example, at least 5° C. or 10° C. above the softening point, to promote bonding of the thermoplastic material to the glass. The heating can be performed with the glass ply in contact with the thermoplastic layers under pressure.

Select commercially available polymer interlayer materials for the interlayer 16 are summarized in Table 1, which provides also the glass transition temperature and modulus for each product sample. Glass transition temperature and modulus data were determined from technical data sheets available from the vendor or using a DSC 200 Differential Scanning calorimeter (Seiko Instruments Corp., Japan) or by ASTM D638 method for the glass transition and modulus data, respectively. A further description of the acrylic/silicone resin materials used in the ISD resin is disclosed in U.S. Pat. No. 5,624,763, and a description of the acoustic modified PVB resin is disclosed in Japanese Patent No. 05138840, the entire contents of which are hereby incorporated by reference in their entirety.

TABLE 1

Example Polymer Interlayer Materials

| Interlayer Material | $T_g$ (°C.) | Modulus, psi (MPa) |
|---|---|---|
| EVA (STR Corp., Enfield, CT) | −20 | 750-900 (5.2-6.2) |
| EMA (Exxon Chemical Co., Baytown, TX) | −55 | <4,500 (27.6) |
| EMAC (Chevron Corp., Orange, TX) | −57 | <5,000 (34.5) |
| PVC plasticized (Geon Company, Avon Lake, OH) | −45 | <1500 (10.3) |
| PVB plasticized (Solutia, St. Louis, MO) | 0 | <5000 (34.5) |
| Polyethylene, Metallocene-catalyzed (Exxon Chemical Co., Baytown, TX) | −60 | <11,000 (75.9) |
| Thermoplastic polyurethanes | −40 | |
| ISD resin (3M Corp., Minneapolis, MN) | −20 | |
| Acoustic modified PVB (Sekisui KKK, Osaka, Japan) | | 140 |
| Uvekol A (liquid curable resins) (Cytec, Woodland Park, NJ) | | |

A modulus of elasticity of the polymer interlayer can range from about 1 MPa to 75 MPa (e.g., about 1, 2, 5, 10, 15, 20, 25, 50 or 75 MPa). At a loading rate of 1 Hz, a modulus of elasticity of a standard PVB interlayer can be about 15 MPa, and a modulus of elasticity of an acoustic grade PVB interlayer can be about 2 MPa.

A plurality of polymer interlayers may be incorporated into a thin glass laminate to provide complimentary or distinct functionality, including adhesion promotion, acoustic control, UV transmission control, and/or IR transmission control.

During the lamination process, the interlayer is typically heated to a temperature effective to soften the interlayer, which promotes a conformal mating of the interlayer to respective surfaces of the glass sheets. For PVB, a lamination temperature can be about 140° C. Mobile polymer chains within the interlayer material develop bonds with the glass surfaces, which promote adhesion. Elevated temperatures also accelerate the diffusion of residual air and/or moisture from the glass-polymer interface.

The optional application of pressure both promotes flow of the interlayer material, and suppresses bubble formation that otherwise could be induced by the combined vapor pressure of water and air trapped at the interfaces. To suppress bubble formation, heat and pressure can be simultaneously applied to the assembly in an autoclave.

Thin glass laminates can be formed using substantially identical glass sheets or, in alternate embodiments, characteristics of the individual glass sheets such as composition, ion exchange profile and/or thickness can be independently varied to form an asymmetric glass laminate.

Thin glass laminates can be used to provide beneficial effects, including the attenuation of acoustic noise, reduction of UV and/or IR light transmission, and/or enhancement of the aesthetic appeal of a window opening. The individual glass sheets comprising the disclosed thin glass laminates, as well as the formed laminates, can be characterized by one or more attributes, including composition, density, thickness, surface metrology, as well as various properties including mechanical, optical, and sound-attenuation properties. Various aspects of the disclosed thin glass laminates are described herein.

The weight savings associated with using thinner glass sheets can be seen with reference to Table 2, which shows the glass weight, interlayer weight, and glass laminate weight for exemplary thin glass laminates having a real dimension of 110 cm×50 cm and a polymer interlayer comprising a 0.76 mm thick sheet of PVB having a density of 1.069 g/cm3.

TABLE 2

Physical properties of glass sheet/PVB/glass sheet laminate.

| Thickness (mm) | Glass Weight (g) | PVB weight (g) | Laminate weight (g) |
|---|---|---|---|
| 4 | 5479 | 445 | 11404 |
| 3 | 4110 | 445 | 8664 |
| 2 | 2740 | 445 | 5925 |
| 1.4 | 1918 | 445 | 4281 |
| 1 | 1370 | 445 | 3185 |
| 0.7 | 959 | 445 | 2363 |
| 0.5 | 685 | 445 | 1815 |

As can be seen with reference to Table 2, by decreasing the thickness of the individual glass sheets, the total weight of the laminate can be dramatically reduced. In some applications, a lower total weight translates directly to greater fuel economy.

The thin glass laminates can be adapted for use, for example, as windows or glazings, and configured to any suitable size and dimension. In embodiments, the glass laminates have a length and width that independently vary from 10 cm to 1 m or more (e.g., 0.1, 0.2, 0.5, 1, 2, or 5 m). Independently, the glass laminates can have an area of greater than 0.1 m2, e.g., greater than 0.1, 0.2, 0.5, 1, 2, 5, 10, or 25 m2.

The thin glass laminates can be substantially flat or shaped for certain applications. For instance, the glass laminates can be formed as bent or shaped parts for use as windshields or cover plates. The structure of a shaped glass laminate may be simple or complex. In certain embodiments, a shaped glass laminate may have a complex curvature where the glass sheets have a distinct radius of curvature in two independent directions. Such shaped glass sheets may thus be characterized as having "cross curvature," where the glass is curved along an axis that is parallel to a given dimension and also curved along an axis that is perpendicular to the same dimension. An automobile sunroof, for example, typically measures about 0.5 m by 1.0 m and has a radius of curvature of 2 to 2.5 m along the minor axis, and a radius of curvature of 4 to 5 m along the major axis.

Shaped thin glass laminates according to certain embodiments can be defined by a bend factor, where the bend factor for a given part is equal to the radius of curvature along a given axis divided by the length of that axis. Thus, for the example automotive sunroof having radii of curvature of 2 m and 4 m along respective axes of 0.5 m and 1.0 m, the bend factor along each axis is 4. Shaped thin glass laminates can have a bend factor ranging from 2 to 8 (e.g., 2, 3, 4, 5, 6, 7, or 8).

Methods for bending and/or shaping thin glass laminates can include gravity bending, press bending and methods that are hybrids thereof. In a traditional method of gravity bending thin, flat sheets of glass into curved shapes, such as automobile windshields, cold, pre-cut single or multiple glass sheets are placed onto the rigid, pre-shaped, peripheral support surface of a bending fixture. The bending fixture may be made using a metal or a refractory material. In an example method of the present disclosure, an articulating bending fixture may be used. Prior to bending, the glass typically is supported only at a few contact points. The glass is heated, usually by exposure to elevated temperatures in a lehr, which softens the glass allowing gravity to sag or slump the glass into conformance with the peripheral support surface. Substantially the entire support surface generally will then be in contact with the periphery of the glass.

A related technique is press bending where flat glass sheets are heated to a temperature corresponding substantially to the softening point of the glass. The heated sheets are then pressed or shaped to a desired curvature between male and female mold members having complementary shaping surfaces. In embodiments, a combination of gravity bending and press bending techniques can be used.

A total thickness of the thin glass laminate can range from about 2 mm to about 4 mm, where the individual glass sheets (e.g., one or more chemically-strengthened glass sheets) can have a thickness of from about 0.5 to about 2 mm (e.g., 0.1, 0.2, 0.3, 0.5, 0.7, 1, 1.4, 1.7, or 2 mm). In embodiments, a chemically-strengthened glass sheet can have a thickness of less than about 1.4 mm or less than about 1.0 mm. In further embodiments, a thickness of a chemically-strengthened glass sheet can be substantially equal to a thickness of a second glass sheet, such that the respective thicknesses vary by no more than 5%, e.g., less than 5, 4, 3, 2 or 1%. According to embodiments, the second (e.g., inner) glass sheet can have a thickness less than about 2.0 mm (e.g., less than 1.4 mm). Without wishing to be bound by theory, Applicants believe that a thin glass laminate comprising opposing glass sheets having substantially identical thicknesses can provide a maximum coincidence frequency and corresponding maximum in the acoustic transmission loss at the coincidence dip. Such a design can provide beneficial acoustic performance for the glass laminate, for example, in automotive applications.

Example glass laminate structures are illustrated in Table 3, where the abbreviation GG refers to a chemically-strengthened aluminosilicate glass sheet, and the term "soda lime" refers to a non-chemically-strengthened glass sheet. As used herein, the abbreviations "SP," "S-PVB" or simply "PVB" may be used for standard grade PVB. The abbreviations "AP" or "A-PVB" are used for acoustic grade PVB.

Applicants have shown that the laminate glass structures disclosed herein have excellent durability, impact resistance, toughness, and scratch resistance. As is well known among skilled artisans, the strength and mechanical impact performance of a glass sheet or laminate can be limited by defects in the glass, including both surface and internal defects. When a glass laminate is impacted the impact point is put into compression, while a ring or "hoop" around the impact point, as well as the opposite face of the impacted sheet, are put into tension. Typically, the origin of failure will be at a flaw, usually on the glass surface, at or near the point of highest tension. This may occur on the opposite face, but can occur within the ring. If a flaw in the glass is put into tension during an impact event, the flaw will likely propagate, and the glass will typically break. Thus, a high magnitude and depth of compressive stress (depth of layer) is preferable. The addition of controlled flaws to surface 3 and acid etch treatment of surfaces 2 and 4 provide such laminates with the desired breakage performance upon internal and external impact events.

Due to chemical strengthening, one or both of the external surfaces of the thin glass laminates disclosed herein are under compression. In order for flaws to propagate and failure to occur, the tensile stress from an impact must exceed the surface compressive stress at the tip of the flaw. In embodiments, the high compressive stress and high depth of layer of chemically-strengthened glass sheets enable the use of thinner glass than in the case of non-chemically-strengthened glass.

In an embodiment hereof, a thin glass laminate can comprise inner and outer glass sheets, such as chemically-strengthened glass sheets wherein the outer-facing chemically-strengthened glass sheet has a surface compressive stress of at least about 300 MPa, e.g., at least 400, 450, 500, 550, 600, 650, 700, 750 or 800 MPa, a depth of at least about at least about 20 µm (e.g., at least about 20, 25, 30, 35, 40, 45, or 50 µm) and/or a central tension greater than about 40 MPa (e.g., greater than about 40, 45, or 50 MPa) and less than about 100 MPa (e.g., less than about 100, 95, 90, 85, 80, 75, 70, 65, 60, or 55 MPa) and the inner-facing glass sheet (e.g., an inner chemically-strengthened glass sheet) has a surface compressive stress of from one-third to one-half the surface compressive stress of the outer chemically-strengthened glass sheet, or equal that of the outer glass sheet.

In addition to their mechanical properties, the acoustic damping properties of the disclosed thin glass laminates have also been evaluated. As will be appreciated by a skilled artisan, laminated structures with a central acoustic interlayer 16, such as a commercially available acoustic PVB interlayer, can be used to dampen acoustic waves. The chemically-strengthened thin glass laminates disclosed herein can dramatically reduce acoustic transmission while using thinner (and lighter) structures that also possess the requisite mechanical properties for many glazing applications.

The present disclosure describes thin glass laminate structures 20 made using a composite interlayer 10 consisting of relatively stiff, rigid outer layers 12 and 14 combined with a relatively softer sound damping central layer 16. The stiff layers 12 and 14 provide improved load/deformation properties to laminates made using relatively thin glass, while the softer sound damping central layer 16 provide improved acoustics through reduced sound transmission.

Acoustic damping is determined by interlayer shear modulus and loss factor. When the interlayer is a large fraction of the total laminate thickness the bending rigidity (load deformation properties) will largely be determined by Young's modulus. Using multilayer interlayers these properties can be adjusted independently resulting in a laminate with satisfactory rigidity and acoustic damping.

Laminated thin glass structures according to the present description may be used as decorative and sound dampening panels on kitchen appliances and in elevator cabs, for example, as well as for windows in vehicle and architectural applications. In an appliance application, for example, a transparent thin glass laminate as described herein may be adhered to the stainless steel front of a dishwasher or other appliances in order to provide a scratch resistant, easy to clean surface and sound insulating properties, while retaining the beauty of the stainless steel that is visible through the thin glass laminate. Alternatively, the glass laminate may be colored or patterned, such as with a wood, stone, granite, marble, picture, graphic or any other desired pattern, in order to provide a sound dampening decorative glass panel on a devise or structure. In an appliance application, such a decorative panel may replace or eliminate the need for the stainless steel panel.

Commercially available interlayers that are candidates for to be used to produce the composite interlayer include SentryGlas Ionomer+PVB; SentryGlas Ionomer+acoustic PVB (e.g. Sekisui's thin 0.4 mm thick acoustic PVB); SentryGlas Ionomer+EVA; SentryGlas Ionomer+TPU; stiff PVB (e.g. Saflex DG)+standard PVB; stiff PVB+acoustic PVB; stiff PVB+EVA; and stiff PVB+TPU. The use of all PVB layers, e.g. for each of the outer layers 12 and 14 and the central layer 16, may be advantageous because of the chemical compatibility between the layers. SentryGlas is less chemically compatibility with other interlayer materials such as EVA or PVB and may require a binder film (for example: a polyester film) between the outer and central layers.

The present description discloses light-weight thin glass laminates having acceptable mechanical and acoustic damping properties. The present description also discloses polymer interlayers and laminated thin glass structures whose mechanical and acoustic properties can be independently engineered by relatively simple adjustments of properties of the individual layers of the polymer interlayer. The layers of the laminated glass structures described herein are individual layers, films or sheet that are bonded together during the lamination process. The layers of the interlayer structures 10 described herein may be coextruded together to form a single interlayer sheet with multiple layers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A glass laminate comprising:
    a first chemically strengthened alkali aluminosilicate glass sheet having a thickness of 1.5 mm or less,
    a second chemically straightened glass sheet having a thickness of 1.5 mm or less, and
    a composite interlayer positioned between the first and second chemically strengthened glass sheets, the composite interlayer consisting of:
        two relatively stiff polymer layers having a Young's modulus of 50 MPa or greater, and selected from the group consisting of polyvinyl butyral (PVB), polycarbonate (PC), or polyethylene terephthalate (PET), and
        a relatively soft polymer layer having a Young's modulus of less than 20 MPa, and selected from the group consisting of polyvinyl butyral (PVB), acoustic polyvinyl butyral (A-PVB), ethylene vinyl acetate (EVA), plasticized polyvinyl chloride (PVC), or thermoplastic polyurethane (TPU),
        wherein the relatively soft polymer layer is disposed between the two relatively stiff polymer layers.

2. The glass laminate of claim 1, wherein the two relatively stiff polymer layers have a Young's modulus of 100 MPa or greater.

3. The glass laminate of claim 1, wherein the two relatively stiff polymer layers have a Young's modulus ranging from 100 MPa to 1000 MPa.

4. The glass laminate of claim 1, wherein the relatively soft polymer layer has a Young's modulus of 10 MPa or less.

5. The glass laminate of claim 1, wherein the relatively soft polymer layer has a Young's modulus ranging from 1 MPa to 10 MPa.

6. The glass laminate of claim 1, wherein the two relatively stiff polymer layers have a Young's modulus 10-100 times greater than the Young's modulus of the relatively soft polymer layer.

7. The glass laminate of claim 1, wherein the composite interlayer makes up a majority of a total thickness of the glass laminate.

8. The glass laminate of claim 7, wherein the composite interlayer makes up at least 57% of the total thickness of the glass laminate.

9. The glass laminate of claim 7, wherein at least one of the first or second glass sheets has a thickness ranging from 0.5 mm to 1.5 mm.

10. The glass laminate of claim 1, wherein the second glass sheet is chemically strengthened.

11. The glass laminate of claim 1, wherein the first chemically strengthened alkali aluminosilicate glass sheet comprises from 8 mol % to about 18 mol % $Na_2O$.

12. The glass laminate of claim 1, wherein the first chemically strengthened alkali aluminosilicate glass sheet comprises from 9 mol % to about 21 mol % $Na_2O$.

13. The glass laminate of claim 1, wherein the first chemically strengthened alkali aluminosilicate glass sheet is an alkali aluminoborosilicate glass.

* * * * *

UNITED STATES PATENT AND TRADEMARK OFFICE
CERTIFICATE OF CORRECTION

PATENT NO.       : 10,596,783 B2
APPLICATION NO.  : 14/402624
DATED            : March 24, 2020
INVENTOR(S)      : William Keith Fisher et al.

Page 1 of 1

It is certified that error appears in the above-identified patent and that said Letters Patent is hereby corrected as shown below:

In the Claims

Column 13, Line 36, Claim 1, delete "straightened" and insert -- strengthened --, therefor.

Signed and Sealed this
Fourteenth Day of July, 2020

Andrei Iancu
*Director of the United States Patent and Trademark Office*